(12) United States Patent
Sood et al.

(10) Patent No.: US 12,430,067 B2
(45) Date of Patent: Sep. 30, 2025

(54) DATA FLOW MANAGEMENT FOR COMPUTATIONAL LOADS

(71) Applicant: Atieva, Inc., Newark, CA (US)

(72) Inventors: Ankur Jai Sood, Menlo Park, CA (US); Amiya Trivedi, Cupertino, CA (US); Kevin Wong, Newark, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/705,325

(22) PCT Filed: Oct. 27, 2022

(86) PCT No.: PCT/US2022/078806
§ 371 (c)(1),
(2) Date: Apr. 26, 2024

(87) PCT Pub. No.: WO2023/077018
PCT Pub. Date: May 4, 2023

(65) Prior Publication Data
US 2025/0044983 A1  Feb. 6, 2025

Related U.S. Application Data

(60) Provisional application No. 63/263,299, filed on Oct. 29, 2021.

(51) Int. Cl.
*G06F 3/06* (2006.01)
(52) U.S. Cl.
CPC .......... *G06F 3/0656* (2013.01); *G06F 3/0604* (2013.01); *G06F 3/0679* (2013.01)

(58) Field of Classification Search
CPC .... G06F 3/0656; G06F 3/0604; G06F 3/0679; G07C 5/0866; B60W 2050/0005
USPC ........................................................ 711/147
See application file for complete search history.

(56) References Cited

U.S. PATENT DOCUMENTS

| | | | |
|---|---|---|---|
| 10,684,626 B1 * | 6/2020 | Martin ................. | G08G 1/0962 |
| 2013/0262868 A1 | 10/2013 | Friedman et al. | |
| 2019/0081817 A1 * | 3/2019 | Sasaki .................... | H04L 12/46 |
| 2021/0089446 A1 | 3/2021 | Fruchter et al. | |

(Continued)

OTHER PUBLICATIONS

International Search Report and Written Opinion for PCT Application No. PCT/US2022/078806, mailed on Jan. 24, 2023, 7 pages.

*Primary Examiner* — Than Nguyen
(74) *Attorney, Agent, or Firm* — Brake Hughes Bellermann LLP

(57) ABSTRACT

Described techniques include producing data at a producer node of a data pipeline for processing vehicle data characterizing an operation of a vehicle. The producer node may select a data buffer from a plurality of shared data buffers shared by at least two consumer nodes and write the data to the selected data buffer. Event data may be received at an event producer node of the data pipeline, and the event data may be written by the event producer node to at least one control buffer of a plurality of shared control buffers that are shared by the at least two consumer nodes. Synchronized consumption of the data from the selected data buffer by each of the at least two consumer nodes may thus be executed, based on the event data, to thereby complete the processing and characterize the operation of the vehicle.

20 Claims, 5 Drawing Sheets

(56) References Cited

U.S. PATENT DOCUMENTS

2021/0142146 A1* 5/2021 Kale .................. G06V 10/82
2022/0155992 A1* 5/2022 Nortman ............. G06F 9/544

* cited by examiner

DATA FLOW MANAGEMENT FOR COMPUTATIONAL LOADS

CROSS-REFERENCE TO RELATED APPLICATION

This application is a 35 U.S.C. § 371 National Phase Entry Application from PCT Application No. PCT/US2022/078806, filed on Oct. 27, 2022, entitled "DATA FLOW MANAGEMENT FOR COMPUTATIONAL LOADS", and designating the U.S., which claims priority to U.S. Patent Application No. 63/263,299, filed on Oct. 29, 2021, and entitled "DATA FLOW MANAGEMENT FOR COMPUTATIONAL LOADS," the disclosures of which are incorporated by reference herein in their entireties.

TECHNICAL FIELD

This description relates to data flow management.

BACKGROUND

Vehicles, such as automobiles, may acquire vast quantities of data related to operations of the vehicles. For example, vehicles may acquire a large volume of data from multiple onboard sensors, as well as from external networks. Such data may be used, for example, to help ensure safe operation of a vehicle, and/or to facilitate semi-autonomous or autonomous driving of a vehicle.

For purposes of ensuring safe operation of a vehicle, and/or to facilitating semi-autonomous or autonomous driving of a vehicle, it is important to process acquired data in a fast and efficient manner, notwithstanding the large volume of data in question. For example, captured data may include sensor data from multiple instances of multiple types of sensors positioned at multiple locations on a vehicle, and such sensor data may be required to be captured, transported and processed to perceive and assess a current environment of a vehicle. Then, further data processing may be required to determine and implement a response to the current environment to obtain a desired outcome (e.g., to avoid a collision).

SUMMARY

A computer program product may be tangibly embodied on a non-transitory computer-readable storage medium and may comprise instructions that, when executed by at least one computing device, are configured to cause the at least one computing device to produce data at a producer node of a data pipeline for processing vehicle data characterizing an operation of a vehicle, select a data buffer from a plurality of shared data buffers, the selected data buffer being shared by at least two consumer nodes of the data pipeline, and write the data to the selected data buffer. The instructions, when executed by the at least one computing device, may be configured to cause the at least one computing device to receive event data at an event producer node of the data pipeline, write the event data from the event producer node to at least one control buffer of a plurality of shared control buffers that are shared by the at least two consumer nodes, and read the event data from the at least one control buffer at each of the at least two consumer nodes. The instructions, when executed by the at least one computing device, may be configured to cause the at least one computing device to execute synchronized consumption of the data from the selected data buffer by each of the at least two consumer nodes, based on the event data, to thereby complete the processing and characterize the operation of the vehicle.

The data may have a data type, and the selected data buffer may be selected based on the data type and the at least two consumer nodes share access to the selected buffer based on the data type. The data may include video data captured by at least one camera of the vehicle. The instructions, when executed, cause the at least one computing device to update a state of the selected data buffer when writing the data to the selected data buffer, the state indicating availability of the selected data buffer to the at least two consumer nodes for consumption thereof. Each of the at least two consumer nodes may include a queue indicating a location of the selected data buffer and the at least one control buffer within the data pipeline. Each of the at least two consumer nodes may include a consumption policy governing a manner in which the data and the event data are consumed. A first consumer node of the at least two consumer nodes may be configured to update a state of the selected data buffer to reflect consumption of the data therefrom by the first consumer node. The instructions, when executed, may cause the at least one computing device to execute the synchronized consumption of the data including controlling a start, stop, or pause of data consumption by each of the at least two consumer nodes. The at least one control buffer may include a plurality of control buffers, and each of the at least two consumer nodes may have access to a single control buffer of the plurality of control buffers. The producer node may be configured to manage exclusive access of the at least two consumer nodes to the selected data buffer and confirm that all of the at least two consumer nodes have completed data consumption therefrom, including updating a state of the selected buffer as being available to receive additional data upon consumption of the data by a final consumer node of the at least two consumer nodes.

According to other general aspects, a computer-implemented method may include producing data at a producer node of a data pipeline for processing vehicle data characterizing an operation of a vehicle, and selecting a data buffer from a plurality of shared data buffers, the selected data buffer being shared by at least two consumer nodes of the data pipeline. The method may include writing the data to the selected data buffer, receiving event data at an event producer node of the data pipeline, and writing the event data from the event producer node to at least one control buffer of a plurality of shared control buffers that are shared by the at least two consumer nodes. The method may include reading the event data from the at least one control buffer at each of the at least two consumer nodes, and executing synchronized consumption of the data from the selected data buffer by each of the at least two consumer nodes, based on the event data, to thereby complete the processing and characterize the operation of the vehicle.

The data may have a data type, and the selected data buffer may be selected based on the data type, and the at least two consumer nodes share access to the selected buffer based on the data type. The method may include updating a state of the selected data buffer when writing the data to the selected data buffer, the state indicating availability of the selected data buffer to the at least two consumer nodes for consumption thereof. A first consumer node of the at least two consumer nodes may be configured to update a state of the selected data buffer to reflect consumption of the data therefrom by the first consumer node. The method may include executing the synchronized consumption of the data including controlling a start, stop, or pause of data consumption by each of the at least two consumer nodes. The at least one control buffer may include a plurality of control buffers, and each of the at least two consumer nodes may have access to a single control buffer of the plurality of control buffers. The method may include managing, at the producer node, exclusive access of the at least two consumer nodes to the selected data buffer confirming, at the producer node, that all of the at least two consumer nodes have completed data consumption therefrom, and updating, at the producer node, a state of the selected buffer as being available to receive additional data upon consumption of the data by a final consumer node of the at least two consumer nodes.

According to other general aspects, a vehicle may include a chassis, a frame mounted on the chassis, a motor mounted within the frame, a plurality of sensors mounted on the vehicle and configured to generate sensor data characterizing an environment of the vehicle, at least one memory including instructions, and at least one processor that is operably coupled to the at least one memory and that is arranged and configured to execute instructions that, when executed, cause the at least one processor to produce data at a producer node of a data pipeline for processing vehicle data characterizing an operation of a vehicle and select a data buffer from a plurality of shared data buffers, the selected data buffer being shared by at least two consumer nodes of the data pipeline. When executed, the instructions may cause the at least one processor to write the data to the selected data buffer and receive event data at an event producer node of the data pipeline. When executed, the instructions may cause the at least one processor to write the event data from the event producer node to at least one control buffer of a plurality of shared control buffers that are shared by the at least two consumer nodes, read the event data from the at least one control buffer at each of the at least two consumer nodes, and execute synchronized consumption of the data from the selected data buffer by each of the at least two consumer nodes, based on the event data, to thereby complete the processing and characterize the operation of the vehicle.

The instructions, when executed, may cause the at least one processor to manage, at the producer node, exclusive access of the at least two consumer nodes to the selected data buffer. When executed, the instructions may cause the at least one processor to confirm, at the producer node, that all of the at least two consumer nodes have completed data consumption therefrom, and update, at the producer node, a state of the selected buffer as being available to receive additional data upon consumption of the data by a final consumer node of the at least two consumer nodes. A first consumer node of the at least two consumer nodes may be configured to update a state of the selected data buffer to reflect consumption of the data therefrom by the first consumer node.

The details of one or more implementations are set forth in the accompanying drawings and the description below. Other features will be apparent from the description and drawings, and from the claims.

DETAILED DESCRIPTION

Figure 1:
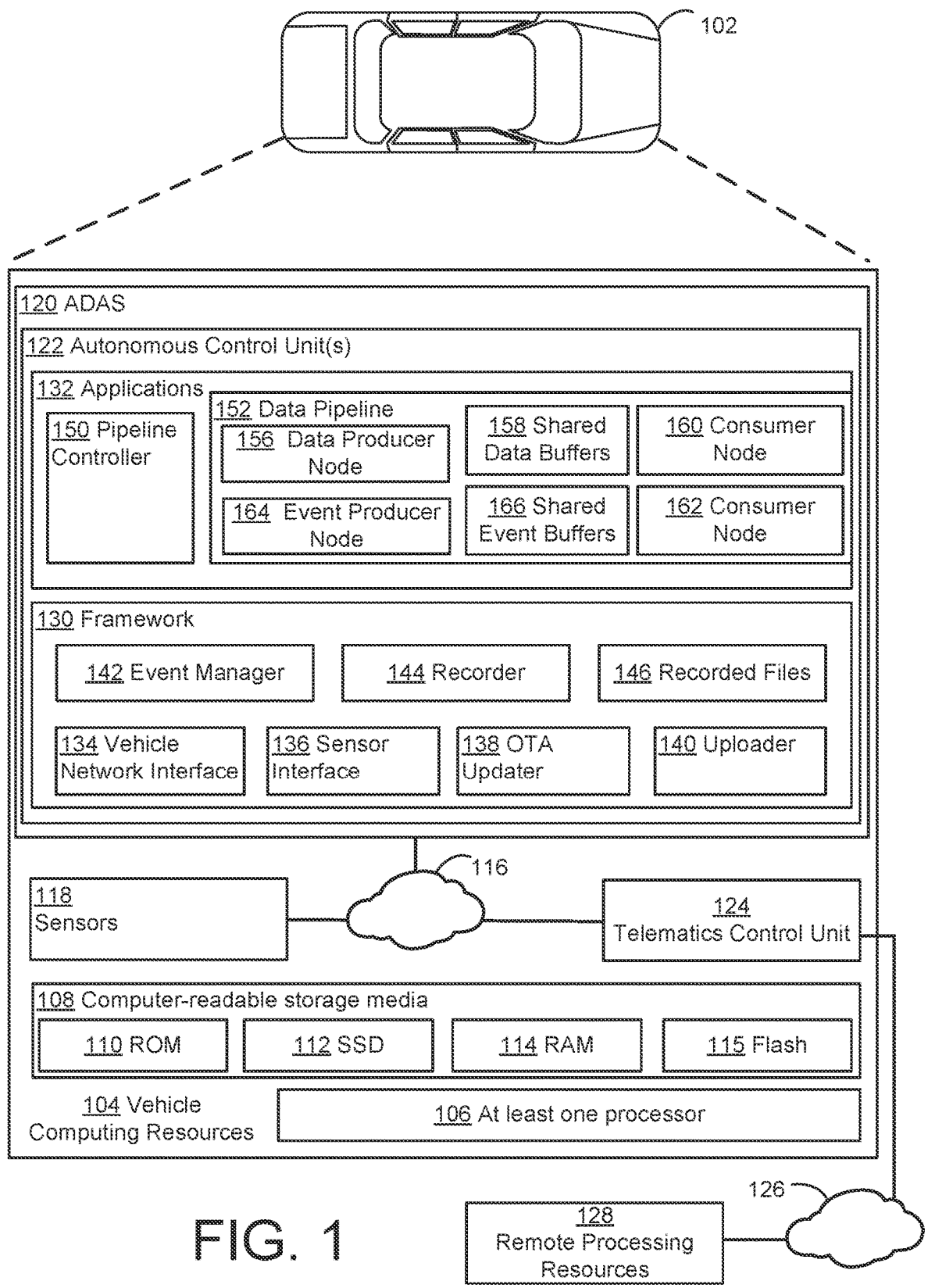
FIG. 1 is a block diagram of a system for dataflow management for computational loads, using a data pipeline.

Described systems and techniques enable fast and efficient transfer of high bandwidth data and critical control signals to maximize the throughput of heavy workloads on embedded systems. For example, a middleware for the creation of modular data pipelines that minimizes expensive copies of data, splits algorithm workloads efficiently into execution nodes, and synchronizes the sharing of data between nodes is described.

In the described middleware, graph-based representation and implementation of nodes may be used to construct a dynamic data pipeline. Each node may include two channels, a data channel and a control channel. The middleware enables sharing of one data channel (and one corresponding set or pool of memory buffers) between two or more nodes requiring the same type of data, while still allowing each node to have a separate dedicated control channel.

Meanwhile, a dedicated controller node may be configured to send control signals to nodes and control the data pipeline(s). The described design is portable and scalable to various platforms.

Conventional middleware frameworks, such as may be found in the Robotic Operating System (ROS), have significant overhead due to the required number of data copies and suboptimal implementations for data transport. Throughput of data pipelines implemented with such conventional middleware suffers from performance issues, since, e.g., each node requesting the same type of data requires independent memory buffers, and corresponding, unnecessary copies of data.

In contrast, in described techniques, data buffers for each node may be shared. As a result, unnecessary data copies may be eliminated, and significant performance improvements are obtained.

In more detail, described techniques enable a middleware solution that uses separate, dedicated data and control channels for each node, and eliminates unnecessary data copies while still retaining independent control of each node in a corresponding data pipeline. Nodes consuming a single/same type of data may share data buffers, and so additional synchronization is provided between each of the nodes to enable such data sharing while avoiding data corruption.

Eliminating unnecessary copies of data reduces resource overhead required to run the data pipelines described herein. Individual control of each node may be maintained, while still enabling sharing of data buffers. The control signals to each node may be managed by a central controller node that is configured to control data flows through an entire system, based on inputs from other nodes and from external signals.

Described techniques are scalable to very large pipelines with large numbers of nodes, since, in various implementations, each consumer node may consume data from buffers per its own consumer policy, without requiring to be blocked by other consumer nodes executing in parallel. Thus, for example, described techniques may be used to transfer vehicle sensor data, including camera images and other vehicle signals, to downstream nodes that, e.g., provide perception algorithms for perceiving vehicle surroundings, and/or enable data collection.

Therefore, for example, it is possible to prioritize primary processing path(s) of captured sensor data for, e.g., environment perception and vehicle control, as well as performing capture of sensor data for analysis and other processing related to an event, without disrupting the primary processing path(s). Consequently, it is possible to identify, transmit, and store a desired subset of event data in a fast and efficient manner, while continuing to use the same sensor data for a primary purpose, such as autonomous driving and control of a vehicle.

As referenced above, it is undesirable at best and infeasible at worst to store or transmit the vast quantities of sensor data collected by sensor-equipped vehicles. Nonetheless, such sensor data contains potentially valuable information. For example, collected sensor data may be analyzed to improve an accuracy level of autonomous driving algorithms. Moreover, sensor data collected around a time of an accident or other driving event may be instrumental in predicting and avoiding accidents and other events in the future. Therefore, it is desirable to capture, transmit, and store minimally sufficient quantities (subsets) of sensor data that are likely to include such valuable information.

Described techniques determine and select event-related data that may be helpful in analyzing driving events and improving a self-driving ability of a vehicle, without disrupting ongoing processing of collected sensor data, and without requiring large or inefficient quantities of processing or memory resources. Accordingly, self-driving capabilities of vehicles may be improved, and the safety and convenience of the drivers may be enhanced.

In the example of FIG. 1, a vehicle 102 is illustrated as a car, but should be understood to represent any type of automobile or automotive vehicle. In other example implementations, the vehicle 102 may represent any mobile, autonomous or semi-autonomous device, including, e.g., a robot, an airplane, a boat, or a drone.

The vehicle 102 may thus include a body of desired type (e.g., a chassis, a frame mounted on the chassis with doors, windows, a roof, trunk, and/or hood), various components for enabling movement of the vehicle, such as wheels/wings, and a suitable motor, such as an electric motor (and associated battery) or internal combustion engine (not separately illustrated in FIG. 1). Various types of vehicle computing resources 104, which may include many different types and configurations of hardware and software resources, may also be included. In the simplified example of FIG. 1, the vehicle computing resources 104 are illustrated as including at least one processor 106, and non-transitory computer-readable storage medium 108.

For example, the at least one processor 106 may represent multiple processors, chipsets, or processing cores. The computer-readable storage medium 108 may represent multiple types of memories, including, e.g., read-only memories (ROM) 110, solid state drives (SSD) 112, random access memories (RAM) 114, or flash memories (Flash) 115.

The vehicle computational resources 104 may also include network hardware used to create a vehicle network 116 within the vehicle 102. For example, the vehicle network 116 may represent, e.g., wiring and related hardware/software to provide one or more busses and related protocols for distributing data within the vehicle 102. As such, the vehicle network 116 provides opportunities for intra-vehicle communication between and among various vehicle subsystems, as described in detail, below.

For example, the vehicle network 116 may utilize existing types of vehicle bus topologies and related busses, including, e.g., the Controller Area Network (CAN) bus, the Local Interconnect Network (LIN) bus, or the Media Oriented Systems Transport (MOST). The vehicle network 116 may also represent automotive-grade Ethernet and various types of Transport Control Protocol/Internet Protocol (TCP/IP) networks.

In some implementations, two or more of these technologies may be combined or utilized together. For example, a physical Ethernet connection may be established throughout the vehicle 102 (e.g., as an Ethernet ring that encircles a chassis and/or cabin of the vehicle 102), and may be used to aggregate or distribute multiple CAN busses.

In many implementations, the vehicle 102 may include multiple sensors 118, which may be used to detect information regarding an environment or surroundings of the vehicle 102. For example, the sensors 118 may include video cameras, Light Detection and Ranging (lidar) sensors, ultrasonic sensors, radar sensors, GPS sensors, and various other types of sensors. The sensors 118 may be distributed within and around a chassis, body, and/or cabin of the vehicle 102, where needed to perform intended functions.

In the simplified example of FIG. 1, the vehicle computational resources 104, including the at least one processor 106, the non-transitory computer-readable storage medium 108, the vehicle network 116, and the sensors 118, are illustrated together for ease of illustration and description. Within the vehicle 102, however, as already noted with respect to the vehicle network 116 and the sensors 118, multiple pairs or groups of processors and memories may be distributed in desired locations within the vehicle 102, together with other related hardware, to provide intended functionalities.

For example, multiple control boards may be assembled using desired ones of the at least one processor 106 and the computer-readable storage media 108, and positioned appropriately within the vehicle 102 to perform desired functions. Such control boards and related hardware and software may be referred to generally as electronic control units (ECUs). For example, one or more ECUs may be used to support and enable corresponding vehicle subsystems. Examples of current vehicle subsystems may include subsystems for navigation, including an advanced driver assistance system (ADAS) 120 for autonomous or semi-autonomous systems, which may include one or more Autonomous Control Units (ACUs) 122. For example, when multiple ACUs are present, one of the ACUs may be designated as a central ACU and used as a central point for distributing data to, or collecting data from, other ACUs. Various other vehicle subsystems may relate to, or include, subsystems for vehicle safety features, climate control, and information/entertainment (infotainment) systems.

Another example of an ECU is illustrated in FIG. 1 as telematics control unit (TCU) 124. The TCU 124 may represent a single site of network connectivity for connecting the vehicle 102 to external network(s) 126. Maintaining the TCU 124 as a single site of network connectivity may provide efficiency by reducing or eliminating a need to reproduce connectivity components (e.g., hardware modems) at multiple locations, or for multiple vehicle subsystems, within the vehicle 102.

Moreover, maintaining a single site of network connectivity may assist in protecting the vehicle 102 from various types of cyberattacks. For example, the TCU 124 may be equipped with firewalls and various other protection mechanisms used to prevent attackers from, e.g., controlling operations or the vehicle 102, or accessing confidential information within the vehicle 102.

The TCU 124 may include multiple modems and/or related hardware (including appropriate ones of the at least one processor 106 and the computer-readable storage media 108) for connecting to two or more external networks 126. For example, the TCU 124 may provide external connectivity to WiFi networks, long term evolution (LTE) networks, or 3G/4G/5G networks.

Accordingly, it is possible to use the external networks 126 to exchange vehicle information with remote processing resources 128. For example, it is possible to perform over-the-air (OTA) updates of software stored using the computer-readable storage media 108, or to upload navigation data from the vehicle 102 to the remote processing resources 128 for analysis or long-term storage.

As further illustrated, the ACU 122 may include a framework 130. The framework may include an operating system (OS) that, e.g., supports operations of one or more applications 132 of the ACU 122, and that enables connectivity with the vehicle network 116. For example, the framework 130 may provide or include an implementation of the Automotive Open Source Architecture (Autosar), which is designed to support deployment of the applications 132 using an operating system based on the Portable OS Interface (POSIX) standard, which is written using C++ and enables service-oriented communication and application programming interfaces (APIs) for communicating with, e.g., the vehicle network 116 and the applications 132. Additionally, or alternatively, the framework 130 may include other OS implementations, such as automotive grade Linux.

In the example of FIG. 1, the framework 130 is illustrated as including a vehicle network interface 134 for communicating with the vehicle network 116. The framework 130 also includes a sensor interface 136, which represents one or more interfaces for obtaining sensor data from the appropriate ones of the sensors 118.

An OTA updater 138 represents a component for receiving updates of the vehicle 102 via the external networks 126. For example, new or updated software may be downloaded via the TCU 124 and installed by the OTA updater 138 within an appropriate or designated memory of the computer-readable storage media 108.

An uploader 140 may be configured to execute any desired transmission of data from the vehicle 102 to the external networks 126, using the vehicle network 116 and the TCU 124. For example, the uploader 140 may be configured to upload processed sensor data, or any vehicle data, to the remote processing resources 128.

An event manager 142 represents a component for detecting, determining, processing, and/or characterizing network data received via the vehicle network interface 134 and/or sensor data received via the sensor interface 136, and for then using the network data and/or sensor data, e.g., to control other functions of the framework 130 and the applications 132. Put another way, the event manager 140 represents a control node for controlling and coordinating operations of the framework 130 and the applications 132, to thereby achieve coordinated functions such as, e.g., sensor fusion, multi-layer perception processing algorithms, and autonomous driving control algorithms for controlling steering, braking, or other functions of the vehicle 102.

In specific examples, the event manager 142 may be configured to control operations of a recorder 144 in recording various types of vehicle data, including sensor data, for storage as recorded files 146. For example, the recorded files 146 may be used to store sensor data related to particular events, including driving-related events such as sudden accelerations/decelerations, or impact events including collisions of the vehicle 102. Then, some or all of the recorded files 146 may be uploaded to the external networks 126, and to the remote processing resources 128, using the uploader 140.

In the simplified example of FIG. 1, the various components or modules 134, 136, 138, 140, 142, 144, 146 of the framework 130 are illustrated as singular, individual modules implemented entirely in the context of the framework 130. In various implementations, however, it will be appreciated that specific features and functions of one or more of the framework modules 134, 136, 138, 140, 142, 144, 146 may be implemented in the context of the applications 132, i.e., as application-layer functions. For example, policies of the event manager 142 in defining and controlling sensor events processed by one or more application(s) 132 and recorded by the recorder 144 for uploading by the uploader 140 may be partially or completely governed or implemented at the application layer of the applications 132.

In the example of FIG. 1, the applications 132 are illustrated as including an application-layer middleware that includes a pipeline controller 150 and a data pipeline 152. As shown, the data pipeline 152 includes a data producer node 156 that is associated with a pool of shared data buffers 158, which are themselves shared with at least two consumer nodes 160, 162. Similarly, an event producer node 164 is associated with a pool of shared event buffers 166, which are themselves shared with the at least two consumer nodes 160, 162.

Figure 2:
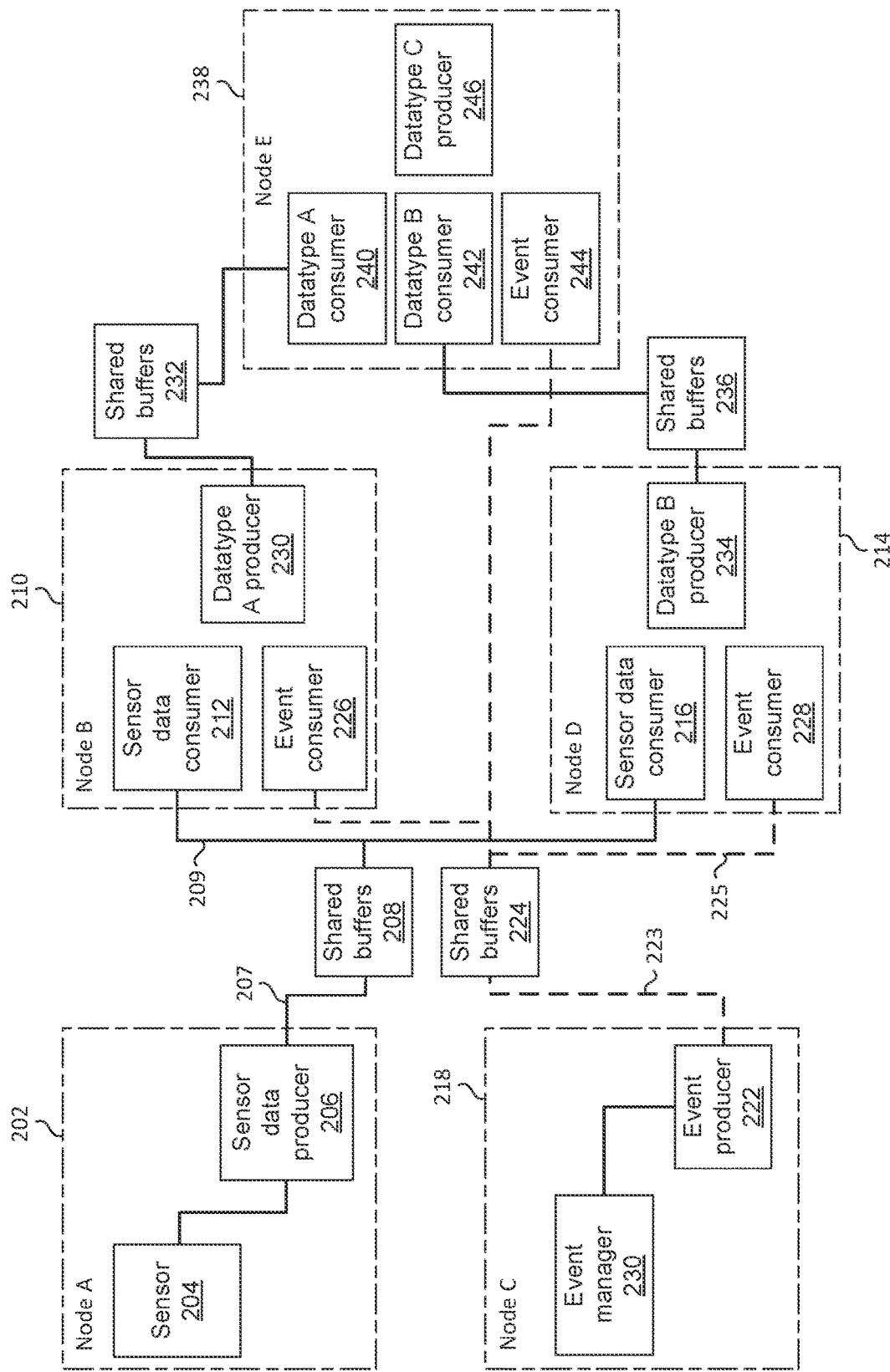
FIG. 2 is a block diagram illustrating a more detailed example of the data pipeline of FIG. 1.

FIG. 2 is a block diagram illustrating a more detailed example of the data pipeline 152, including more example details of the consumer nodes 160, 162, as well as the various communications channels existing, e.g., between the data producer node 156 and the shared data buffers 158, between the shared data buffers 158 and the consumer nodes 160, 162, between the event producer node 164 and the shared event buffers 166, and between the shared event buffers 166 and the consumer nodes 160, 162. For purposes of the simplified example of FIG. 1, however, it may be appreciated that the data producer node 156 generally produces one or more of various types of data related to, e.g., received sensor data from one or more of the sensors 118 (or previously-processed versions thereof), which may be used by one or both of the consumer nodes 160, 162 for downstream processing. Accordingly, the consumer nodes 160, 162 may be provided with shared access to the shared data buffers 158.

Similarly, the event producer node 164 generally produces one or more of various types of control data. Such control data may be used to control operations of one or both of the consumer nodes 160, 162, e.g., to issue commands to start, stop, or pause processing. Accordingly, the consumer nodes 160, 162 may be provided with shared access to the shared event buffers 158, so as to receive such control signals in a timely fashion.

In example implementations, the pipeline controller 150 may be configured, for example, to configure an initial, default, or static set of channels or connections between nodes and buffers of the data pipeline 152. The pipeline controller 150 may be further configured to change (e.g., re-wire) channels during operation of the data pipeline.

The pipeline controller 150 may be implemented as part of, or in conjunction with, the event manager 142. For example, events processed by the event manager 142 may also serve as, or be used to determine, pipeline control events implemented using the pipeline controller 150 and the event producer 164.

For example, as referenced above but not specifically illustrated in FIG. 1 in detail, data processed using the data pipeline 152 may be used for vehicle control as part of the ADAS 120. For example, processed sensor data may be routed through the vehicle network interface 134 and over the vehicle network 116 to an appropriate ECU for vehicle control. For example, such vehicle control may include steering or braking of the vehicle 102. Accordingly, processed sensor data and related data represents an extremely large volume of high priority data, which must be transmitted and processed quickly and accurately to maintain safe operation of the vehicle 102.

Nonetheless, much of this processed sensor data cannot, or should not, be transmitted or stored for long term use. In particular, quantities of local storage at the computer-readable storage media 108 may be very limited, while quantities of processed sensor data, including perception data and vehicle control data, may be generated continuously in vast quantities.

Moreover, there may be little need or motivation to attempt to store much or all of the vehicle control data. For example, the vehicle 102 may travel for a period of time uneventfully, with all sensor and control functionalities occurring as expected. Further, the vehicle 102 may travel for many hours, and the vehicle 102 may represent a fleet of many thousands of vehicles, so that it would be impractical, impossible, and undesirable to attempt to store such data either locally at the vehicle 102 and/or using the remote processing resources 128. Still further, attempting to store and analyze large or continuous quantities of vehicle sensor and control data may increase a likelihood of identifying the vehicle 102 uniquely, and thereby compromising a privacy of a user of the vehicle 102.

On the other hand, capturing important and meaningful vehicle events that may occur during use of the vehicle 102 may represent critical opportunities to improve relevant sensor and control (e.g., navigation) algorithms. For example, such event-specific vehicle data may represent, or correspond to, malfunctions or crashes of the vehicle 102.

Other events may relate to unexpected or undesirable driving conditions, such as sudden turns, accelerations, or decelerations. Such events may be correlated with, or caused by, external events, such as hazardous road conditions. In other examples, such events may be cause by driver error or distraction.

By capturing sensor and control data related to such events, the ADAS 120 enables fast, efficient, cost-effective analysis of operations of the vehicle 102, without overwhelming available resources for data storage, transmission, and analysis. As a result, it is possible to continuously improve the vehicle 102, including improvements to vehicle self-navigation and safety of users of the vehicle 102.

As referenced above, the event manager 142, and/or one or more of the applications 132, may be configured to define such events, as well as related event parameters characterizing a manner and extent to which related event data is captured, stored, transmitted, and analyzed. For example, the event manager 142 may specify a number of seconds of sensor data before and after an event (e.g., a collision) that should be captured, stored, and transmitted to the remote processing resources 128. Then, the pipeline controller 150 may be configured to control the data pipeline 152 to implement event data capture according to the specifications of the event manager 142.

Therefore, some of the functions of the data pipeline 152 may relate to storing captured event data locally at the vehicle 102, and/or transmitting captured event data to the remote processing resources 128. However, techniques for such storage, transmission, and analysis of event data may vary widely based on various factors, such as a type and priority of the data, or of the event related to the data. For example, event data related to a collision may need to be transmitted quickly, perhaps in advance of a potential or actual malfunction of related hardware (e.g., damage to the TCU 124, or loss of power for executing a transmission).

In addition to the types of event-related data just described, and use thereof for obtaining operational improvements, the data pipeline 152 may enable fast, efficient, and flexible data management during normal operations of the vehicle 102. For example, as referenced above, some operations of the data pipeline 152 may relate to perception processing, which refers to the use of the system of FIG. 1 to recognize, capture, characterize, and otherwise perceive a surrounding environment of the vehicle 102.

Once such an environment is correctly perceived, subsequent decisions and associated operations may be implemented for desired navigation or other control of the vehicle 102, using the ADAS 120. Thus, in a simplified example, one instance of the ACU 122 may be configured for sensor processing data perception processing to recognize an obstacle in front of the vehicle 102, while another instance of the ACU 122 may be configured for navigation and control processing to cause the vehicle 102 to brake or avoid the obstacle.

In more specific examples, various types of sensor processing may involve multiple stages, such as, e.g., preprocessing of the data, processing using deep learning models, post processing, and feeding of the data to one or more downstream applications. Therefore, the middleware provided by the pipeline controller 150 and the data pipeline 152 represents a generic configuration enables building of a variety of different pipelines required for processing of sensor data for autonomous control.

Put another way, the application programming layer provided by the middleware of FIG. 1 provides a unified application framework that enables different applications to be ported on the ADAS 120 platform for ACUs 122, e.g., connection of different application components and application processing components using a graph-based node data flow(s) to provide a generic framework with which it is possible to construct desired connections between different processing nodes (event and consumer nodes) in a desired manner(s).

Advantageously, as described above, the system of FIG. 1 enables data flows across multiple processes without having to copy data, i.e., to minimize or eliminate data copying in the data pipeline 152. In conventional systems, as referenced, such copies may cause bottlenecks in data pipelines that significantly reduce a performance of the data pipelines.

In other advantages, while performing the described data processing of very high bandwidth data from multiple different sensors, the system of FIG. 1 provides an ability to control the operation of various nodes in response to a malfunction or other event, and/or if an overall state of the driving of the vehicle 102 changes. For example, such enabled changes or on-the-fly operations of the data pipeline 152 may include changes such as starting, stopping, pausing, or performing designated error exception handling processes. In other words, it is possible to continue with high bandwidth, high frame rate data processing, while retaining an ability to interrupt such processing in a timely manner to respond to any changing conditions during driving.

As a result, it becomes possible to implement efficient data flows to and from the ACU(s) 122, including building such data flows to have extremely high throughput, to thereby obtain an overall system functionality for the ADAS 120. For example, the ACU 122 may represent a particular compute board with multiple different camera feeds coming from a camera of the sensors 118. In such cases, the data pipeline 152 may include a node receiving raw image data from the camera, a node converting such image data into a format expected by a deep learning model, and the deep learning model itself, followed by a post-processing node (including, e.g., data compression). Then, different nodes of separate ACU boards may perform a different collection of nodes, so that the ADAS 120 provides an overall system functionality, e.g., level 2.5 or level 3.0 (or higher) self-driving functionality.

Returning now to FIG. 2, as mentioned above, a block diagram of a more detailed example implementation of the system of FIG. 1 is illustrated. In the example of FIG. 2, the data pipeline 152 represents an example of a producer/consumer design pattern for, among other purposes, providing a high-speed, high-bandwidth, synchronizing middleware for the sharing of data between producing and consuming nodes using light weight event data, while minimizing a number of data copies required to do so.

In FIG. 2, a first node 202 represents a producing node that includes a sensor 204 and a sensor data producer 206. For example, as reference d, the sensor 204 may represent a camera transmitting video and images to the sensor data producer 206. Although FIG. 2 illustrates sensor 202 and the sensor data producer 206 as being included within the node 202, an alternative representation or implementation may include just the sensor data producer 206 within the node 202, receiving data from the sensor 202.

The sensor data producer 206 may represent a software module or component that may perform some pre-processing of the received video stream, and that is configured to utilize a data channel 207 to populate shared buffers 208 (which may be referred to as shared data buffers 208) with the video stream in the manner described below. For example, the shared data buffers 158 may be implemented using the RAM 114 of FIG. 1, e.g., using a designated address space within an instance of the RAM 114 provided on the ACU 122.

In more detail, the sensor data producer 206 may be configured to select at least one empty buffer from among the plurality of shared data buffers 208 for receiving a current output of data, e.g., the example video stream. The sensor data producer 206 may also update a state of the selected buffer, e.g., to indicate that the selected, filled buffer has been filled and released for use by any consumer node with access to the shared data buffers 208. The sensor data producer 206 may also update the selected, filled buffer to identify the selected, filled buffer as being designated for such consumer nodes.

That is, in the producer/consumer design pattern of FIG. 2, there may be multiple consumers for each producer. In particular, as shown, a consumer node 210 may include a sensor data consumer 212 configured to retrieve data from the shared data buffers 208 via data channel 209. Similarly, a consumer node 214 may include a sensor data consumer 216 configured to retrieve data from the shared data buffers 208 via data channel 209. For example, both of the sensor data consumers 212, 216 may be configured to use the video data stored in the designated buffer of the shared buffers 208 as part of a larger video processing pipeline that implements an algorithm that requires two types of processing of the video stream. Thus, the design of FIGS. 1 and 2 enables efficient splitting of algorithm workloads, without requiring copying of the video stream data stored in the shared data buffers 208.

Accordingly, the sensor data consumers 212, 216 may be configured to implement shared, synchronized, or serial access to the filled buffer of the shared data buffers 208. For example, a control node 218 is illustrated as including an event manager 220 and an event producer 222. For example, the event manager 220 may represent the event manager 142 of FIG. 1. As may be understood from the above description of the event manager 142, the event producer 222 may be configured to issue control (e.g., event) notifications via a control channel 223 to shared buffers 224 (which may be referred to as shared control buffers 224).

A control channel 225 may be configured to connect the shared control buffers 224 to an event consumer 226 (which may also be referred to as a control consumer 226) and an event consumer 228. Accordingly, a control signal or message stored using the shared event buffers 224 may be accessed by both of the event consumers 226, 228.

The sensor data consumers 212, 216 may both receive the control data from the shared control buffers 224. In some implementations, the shared control buffers 224 may include multiple control buffers, each in a one-to-one relationship with a single corresponding event consumer, e.g., with the event consumer 226 and the event consumer 228. In such implementations, it is not necessary to perform synchronization of the various event consumers, as each event consumer simply accesses its designated control buffer of the shared control buffers 224.

Once the sensor data consumers 212, 216 receive shared data from the designated data buffer of the shared data buffers 208, the designated data buffer may be released for reuse by the sensor data producer 206. For example, the sensor data consumer 212 may initially retrieve data from the designated buffer of the shared data buffer 208 and mark the designated buffer as having been accessed by the sensor data consumer 212. The sensor data consumer 216 may then take its turn to retrieve the data from the designated buffer of the shared data buffer 208 and mark the designated buffer as having been accessed by the sensor data consumer 216, which, in the example is equivalent to marking the designated buffer as having been accessed by all of the necessary sensor data consumers sharing the shared data buffers 208. At this point, the designated buffer may be marked as being free for reuse, e.g., to be filled by subsequent sensor data.

The shared data buffers 208 may be shared by the consumer nodes 210, 214 based on a type of data stored in the shared data buffers 208. For example, a data type may be defined by, or associated with, a corresponding sensor type (e.g., camera, lidar, sonar, or radar) of a sensor producing the data. In other examples, sensors of a single type may produce multiple types of data for purposes of shared data within the data pipeline 152. In other examples, processing of data may cause it to be classified as having a different type, such as "pre-processed," or "post-processed." Various combinations of these and other data types are also possible.

In the example of FIG. 2, as described above, the sensor 204 may represent a camera, so that the resulting data type may be classified as "video data." As also described, both the consumer nodes 210, 214 may access the shared data buffers 208, so that the shared data buffers 208 may be classified as shared video data buffers.

As further illustrated in FIG. 2, the consumer node 210 may also be a producer node, e.g., may include a datatype A producer 230, outputting data having datatype A to shared data buffers 232. Similarly, the consumer node 214 may also be a producer node, e.g., may include a datatype B producer 234 of data having datatype B, outputting to shared data buffers 236. In other words, a node may represent either or both of a producer node or a consumer node. As such, a node may be referred to as a consumer node when referring to its consumption of produced data, or as a producer node when referring to its production of data, or may be referred to simply as a node when referencing a node that both produces and consumes data.

In FIG. 2, a node 238 may represent a consumer node that includes a datatype A consumer 240, and a datatype B consumer 242. The consumer node 238 may also include an event consumer 244 that is configured to receive event or control data from the shared control buffers 224.

The node 238 may also represent a producer node that includes a datatype C producer 246. In other words, the node 238 may be configured to receive data of datatypes A, B, perform some processing on the received data, and output data of a new type, referred to as datatype C.

Figure 3:
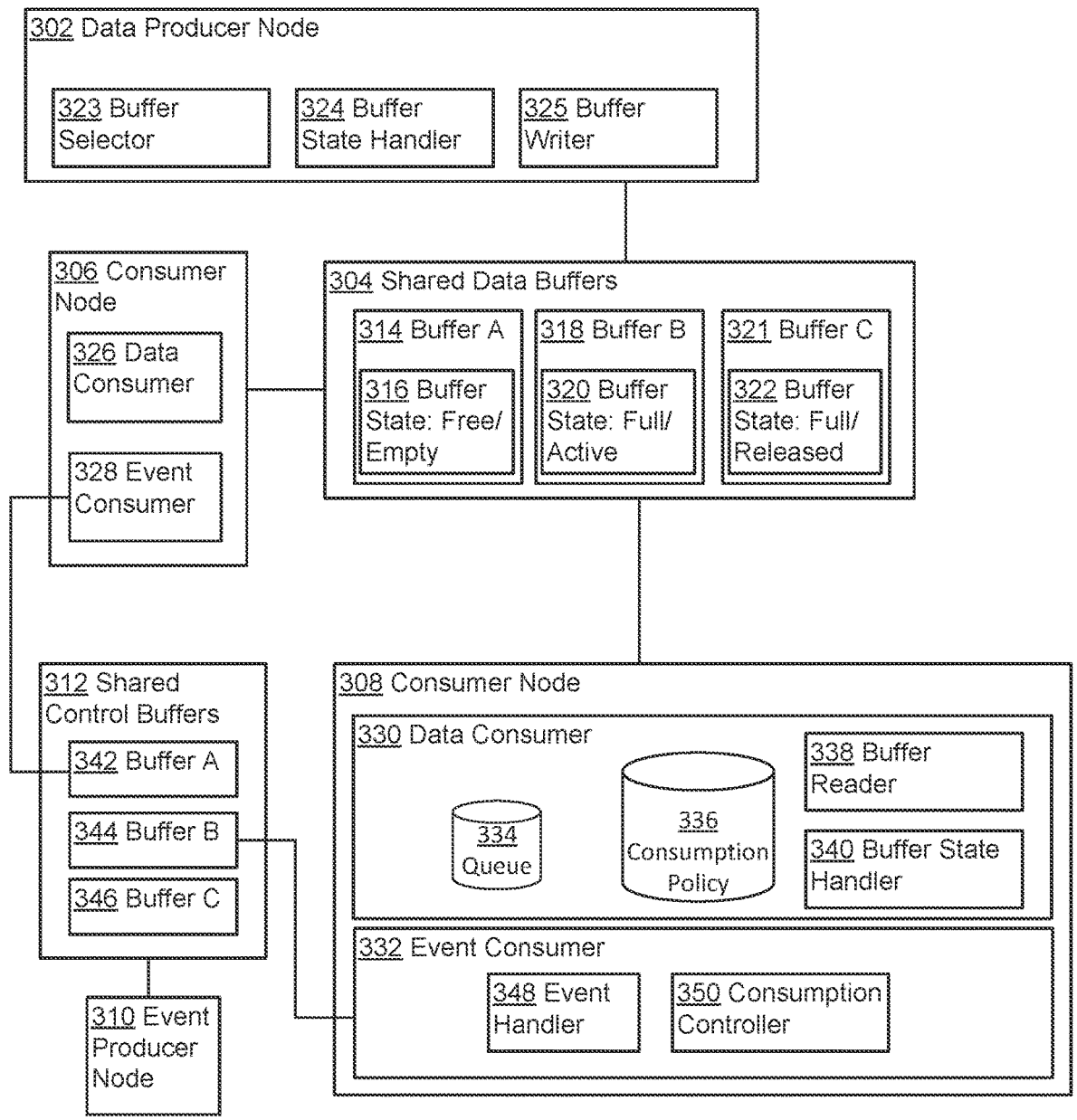
FIG. 3 is a block diagram illustrating more detailed examples of elements of the data pipeline of FIGS. 1 and 2.

FIG. 3 is a block diagram of a more detailed example implementation of the system of FIGS. 1 and 2. In the example of FIG. 3, and consistent with the above examples of FIGS. 1 and 2, nodes of a data pipeline may be constructed and defined with the following conventions and terminologies. For example, if a node produces any data, the node is considered to contain a producer. If the node consumes any data, the node is considered to contain a consumer for each type of data the node consumes. Each node has at least one consumer for control signals, which may be received from a dedicated controller node. If a node has a producer it also contains a pool of buffers which is shared by the current node and each consumer in the data pipeline requesting the produced data type. Each consumer may be provided with a queue that contains the location of the shared data buffers to be consumed by the node. The consumer will fill the queue based on its own data consumption policy.

When a producer component produces data, the producer component chooses a free buffer from its pool of buffers and marks the free buffer as released. Consumers in other nodes may then acquire released buffers one at a time and consume them. This consumption process may be managed by synchronization components for each buffer. When all consumers have consumed the data, the corresponding buffer may be released back to the producer for reuse. A similar or same approach may be used for control channels in the node. However, control channels may be limited to include one producer and only one consumer, in which case coordinating shared buffer access may not be a concern. A central controller node may be used to send control signals to all the other nodes in the system. This controller node receives inputs from other nodes in the system and external signals, and contains logic configured to coordinate the data flows through a corresponding data pipeline.

Illustrating the above and related points in more detail, FIG. 3 includes a data producer node 302 using shared data buffers 304. A consumer node 306 and a consumer node 308 are illustrated as sharing access to the shared data buffers 304. An event producer node 310 is illustrated as using shared control buffers 312 to distribute control signals to the consumer nodes 306, 308, as referenced above and described with respect to more detailed examples, below.

The shared data buffers 304 are illustrated as including a first buffer 314 and associated buffer state 316, a second buffer 318 and associated buffer state 320, and a third buffer 321 and associated buffer state 322. During operation, the data producer node 302 may implement a buffer selector 323 configured to select from among the buffers 314, 318, 321, a buffer state handler 324 configured to update a corresponding state of the states 316, 320, and 322, and a buffer writer 325 configured to write produced data to a currently selected buffer.

For example, the buffer selector 323 may be configured to monitor the shared data buffers 304 to determine a current state of each of the buffers 314, 318, 321, including determining which of the buffers 314, 318, 321 is currently available to receive produced data. For example, the buffer state 316 of the buffer 314 may be marked as free or empty. For example, the buffer 314 may have been previously used by one or both of the consumer nodes 306, 308 to acquire buffered data, and then released for further use.

The buffer state 320 of the buffer 318 may be marked as full and active, meaning that the buffer 318 has been populated with data and is currently being used/shared by one or more consumer nodes to acquire the buffered data. The buffer state 322 of the buffer 321 may be marked as full and released, meaning that the buffer 321 has been populated with data that has been acquired by corresponding consumer nodes and released back to the data producer node 302 for the writing of a subsequent round of data.

It will be appreciated that the referenced states 316, 320, 322 are intended merely as non-limiting examples. Other states may be designated, and different combinations of states may be used. Other synchronization or coordination components may be included in or with the shared data buffers 304, as well.

The buffer state handler 324 may be configured, e.g., to update a new buffer state from a current buffer state. For example, the buffer state handler 324 may be configured to empty or delete data from the buffer 321 and change the buffer state 322 to free/empty.

The buffer writer 325 may be configured to execute the actual writing of data to a selected buffer. Although the simplified example of FIG. 3 illustrates the use of single buffers, it will be appreciated that specific quantities of data may require the writing of data to two or more buffers, with corresponding selection and state handling operations of the buffer selector 323 and the buffer state handler 324, respectively.

As described with respect to FIGS. 1 and 2, the consumer node 306 may include a data consumer 326 configured to consume data from a buffer of the shared data buffers 304 and an event consumer 328 configured to consume control signals from the event producer node 310. Similarly, the consumer node 308 may include a data consumer 330 configured to consume data from a buffer of the shared data buffers 304 and an event consumer 332 configured to consume control signals from the event producer node 310.

In FIG. 3, the consumer node 308 is illustrated in more detail than the consumer node 306, although the consumer node 306 may also include the same or similar components as described and illustrated with respect to the consumer node 308. For example, the data consumer 330 of the consumer node 308 includes a queue 334.

As described herein, the queue 334 may include control or synchronization information determined, e.g., from the event producer node 310, or from other sources. The queue 334 may include identification of one or more shared data buffers 304 or shared control buffers 312 that may be used by the data consumer 330, as well as information characterizing a manner of such use.

The queue 334 may be configured in part during an initialization of the data consumer 330, prior to any production of data by the data producer node 302, e.g., to identify the shared data buffers 304 and other shared data buffers that may be used by the data consumer 330. In other aspects, the queue 334 may be updated dynamically, depending on a current state of operation of the data consumer 330 or other data consumers.

The data consumer 330 also includes a consumption policy 336. For example, the consumption policy 336 may determine a manner in which the data consumer 330 consumes data from a shared buffer (e.g., whether, when, and/or how the data is consumed).

For example, such consumption may occur on a first in, first out (FIFO) basis, or may include consumption of most recent data. Additionally, or alternatively, a consumption policy may dictate a quantity of data to be retrieved, e.g., in terms of data size or in terms of a corresponding time window (e.g., capturing thirty seconds worth of video). The consumption policy 336 may be configured in part during an initialization of the data consumer 330, and may also be updated dynamically during operation of a data pipeline using the components of FIG. 3.

A buffer reader 338 may be configured to execute reading of data from a designated buffer, based on the queue 334 and the consumption policy 336. For example, although not separately illustrated in FIG. 3, the buffer reader 338 may forward consumed data for processing, store the consumed data in a file for later use (e.g., using the recorder 144 of FIG. 1), and/or transmit the consumed data to a producer of the node 308, or to another consumer.

A buffer state handler 340 may be configured to perform state updates of appropriate ones of the buffer states 316, 320, 322, based on actions of the buffer reader 338. For example, the buffer state handler 340 may mark a buffer as being used (accessed) by the data consumer 330 while the buffer reader 338 is reading data therefrom, and may mark the buffer as released for use by a subsequent consumer node (e.g., the consumer node 306) or by the data producer node 302, once the buffer reader 338 has completed a reading operation using the buffer in question.

Thus, as described above, access to the various ones of the shared data buffers 304 by the consumer nodes 306, 308 may be managed by the data producer node 302. Accordingly, shared access to a specific buffer may be synchronized among multiple consumer nodes, using various techniques, some of which are described herein.

For example, synchronized access may be provided as part of a publish/subscribe (pub/sub) system, in which the data producer node 302, e.g., the buffer selector 323 and/or the buffer state handler 324, track a set of consumer nodes sharing a given buffer. Then, a buffer state of the corresponding buffer may include an indication of which consumer nodes have or have not yet accessed the shared buffer in question. In additional or alternative examples, each consumer node may check its assigned shared buffer(s) at defined intervals, or according to a schedule(s), or in response to some other triggering event(s).

For example, the shared data buffer 318 may be filled and designated by the data producer node for sharing by the consumer nodes 306, 308, e.g., by consumer nodes known to consume (e.g., subscribe to consumer) certain types of data (e.g., video data). Therefore the data producer node 302 may notify (e.g., publish) the consumer nodes 306, 308 that the shared data buffer 318 contains data to be consumed.

The consumer nodes 306, 308 may then be provided with synchronized access to the shared data buffer 318. For example, the shared data buffer 318 may be locked to any/all other consumer nodes while a single consumer node consumes data. One or more notifications may be sent to remaining consumer nodes once a current consumer node completes data consumption, or remaining consumer nodes may check periodically, or after a defined time or in accordance with a defined schedule. Remaining consumer nodes may be prioritized or otherwise ordered with respect to accessing the shared data buffer 318. Consumer nodes may each update a state of the shared data buffer (e.g., using buffer state handler 340) upon completion of accessing specified data therefrom.

Once all consumer nodes have received data from a shared data buffer, the shared data buffer may be marked as free for further use. For example, the producer node 302 may track a total number of consumer nodes expected to access a shared data buffer, or may track individual consumer nodes to determine when all relevant consumer nodes have obtained available data. Additionally, or alternatively, a time limit for access to a shared data node may be set. For example, as described herein, some consumer nodes may be paused or stopped, and may not access a shared data buffer as expected.

The shared control buffers 312 are illustrated as including control buffers 342, 344, 346. The control buffers 342, 344, 346 may be connected to designated ones of the event consumers 328, 332.

As referenced above, such connections may be implemented in a one-to-one manner. For example, the event consumer 328 of the consumer node 306 is illustrated as being connected to the buffer 342, while the event consumer 332 of the consumer node 308 is illustrated as being connected to the buffer 344. In such implementations, it may not be necessary to implement the types of buffer sharing and synchronization described with respect to the shared data buffers 304. In other implementations, however, two or more event consumers may share a single control buffer of the shared control buffers 312, in which case synchronization may be required.

The event consumer 332 is illustrated as including an event handler 348 and a consumption controller 350. For example, the event handler 348 may be configured to receive a control event from the buffer 344. For example, a control event may include a command to stop, start, or pause buffer reading activities. Such commands may include more detailed instructions characterizing a manner and extent of such stop, start, or pause instructions.

Additionally, or alternatively, control events may relate to updates to the queue 334, or to the consumption policy 336. Control events may also describe a type of processing to be performed at the consumer node 308, or operations of the buffer reader 338 in reading, storing, or transmitting read or processed data.

The consumption controller 350 may be configured to control the data consumer 330 to implement any such control events. For example, the consumption controller 350 may include multiple components or modules that are each dedicated to one or more of the types of control events just referenced, and the event handler 348 may route a particular event to a corresponding module of the consumption controller 350.

In specific examples, the consumer node 306 may be configured to execute (portions of) perception processing or control processing related to autonomous driving of the vehicle 102. The consumer node 308 may be configured to perform analysis of specific types of driving events, such as sudden acceleration, deceleration, or turns, and/or crashes or collisions.

Thus, FIGS. 1-3 illustrate that access to shared data buffers may be managed by a common data producer(s)

through shared buffer pool(s). For example, the data producer node 302 may manage whether a shared buffer is available or in-use, as well as which consumer nodes have consumed data. The event producers and consumers (e.g., event producer node 310 and event consumer 332) as a particular data type that each consumer node in the pipeline subscribes to as a condition of participating in the data pipeline.

Figure 4:
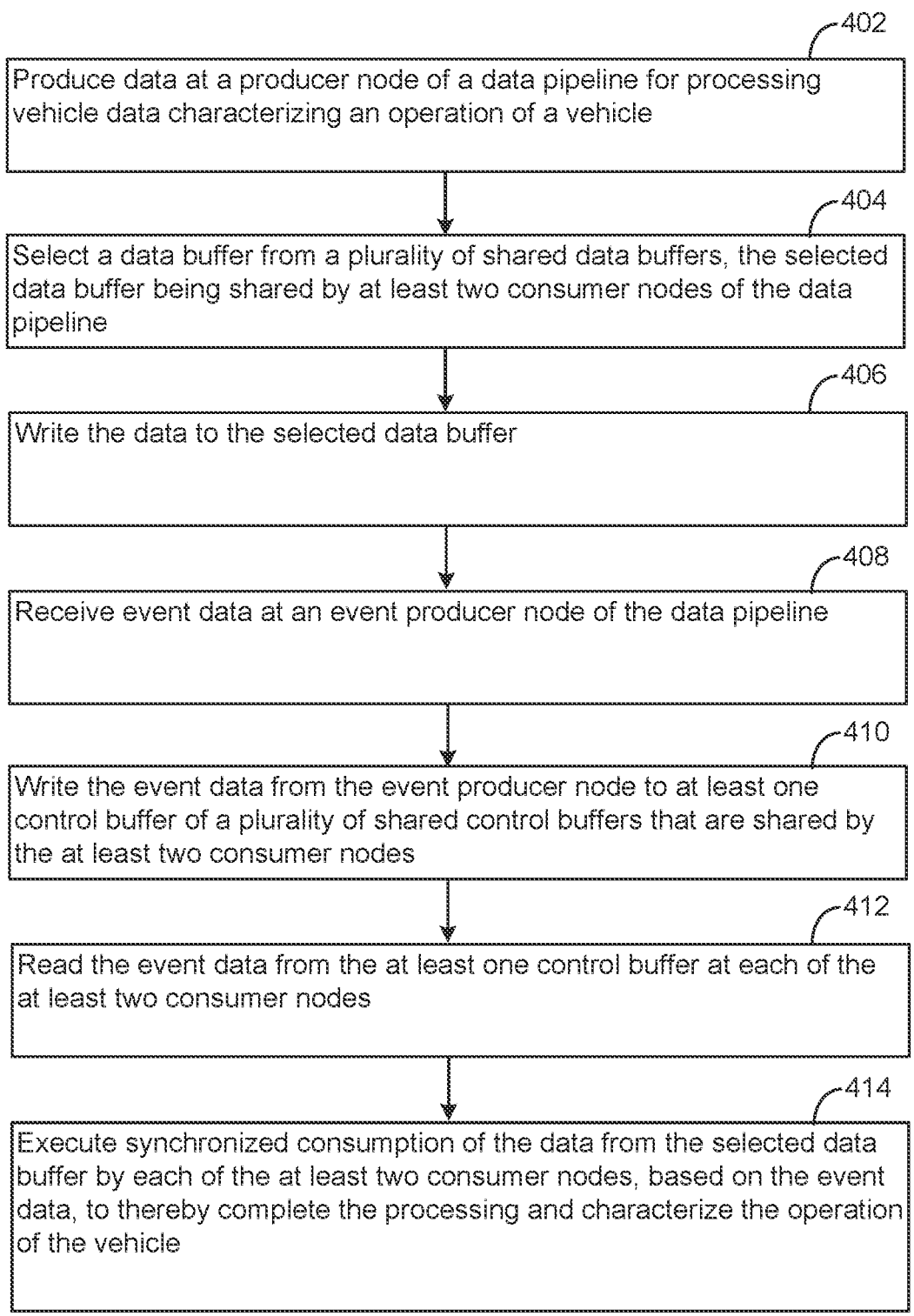
FIG. 4 is a flowchart illustrating example operations of the systems of FIGS. 1-3.

FIG. 4 is a flowchart illustrating example operations of the systems of FIGS. 1-3. In the example of FIG. 4, operations 402-414 are illustrated as separate, sequential operations. In various implementations, the operations 402-414 may include sub-operations, may be performed in a different order, may include alternative or additional operations, or may omit one or more operations. Further, in all such implementations, included operations may be performed in an iterative, looped, nested, or branched fashion.

In the example of FIG. 4, data is produced at a producer node of a data pipeline for processing vehicle data characterizing an operation of a vehicle (402). For example, video data or lidar data may be produced at a node of the data pipeline, to be used in providing autonomous control of the vehicle.

A data buffer may be selected from a plurality of shared data buffers, the selected data buffer being shared by at least two consumer nodes of the data pipeline (404). For example, the producer node may select an available plurality (e.g., pool) of data buffers, such as an empty and/or free (e.g., erasable) buffer(s). The producer node may designate the two or more consumer nodes for consuming the data. Additionally, or alternatively, the two or more consumer nodes may share the data based on a data type of the data (e.g., video or lidar). Additionally, or alternatively, the two or more consumer nodes may be notified of the availability of the data at the shared data node. Additionally, or alternatively, each of the two or more consumer nodes may include, or have access to, a queue that designates shared data buffers to access.

The data may be written to the selected data buffer (406). For example, the producer node may write the data to the selected data buffer and then update a state of the selected data buffer to indicate that data has been written and is available for download by the two or more consumer nodes.

Event data may be received at an event producer node of the data pipeline (408). For example, the event data may reflect an event related to an operation(s) of the vehicle, such as a sudden acceleration, turn, deceleration, or collision.

The event data from the event producer node may be written to at least one control buffer of a plurality of shared control buffers that are shared by the at least two consumer nodes (410). For example, the event producer node may write the event data to a number of control buffers that corresponds to a number of the at least two consumer nodes, so that there is a one-to-one relationship between the control buffers and the consumer nodes.

The event data may be read from the at least one control buffer at each of the at least two consumer nodes (412). For example, as just referenced, each consumer node may be assigned a corresponding control buffer, so that the event producer node may provide centralized, individualized control over operations of the consumer nodes.

Synchronized consumption of the data from the selected data buffer may be executed by each of the at least two consumer nodes, based on the event data, to thereby complete the processing and characterize the operation of the vehicle (414). For example, the event data may control a start, stop, or pause of a designated consumer node, through an intervening/corresponding control buffer. The producer node may manage access of the at least two consumer nodes to the shared data in the selected data buffer (e.g., whether a buffer is available or being used, and/or which consumer node(s) have already accessed the selected buffer to obtain the shared data). Further, each of the consumer nodes may consume the shared data according a consumption policy and/or queue, as described above. In example embodiments, the producer node may thus be configured to manage exclusive access of the at least two consumer nodes to the selected data buffer and confirm that all of the at least two consumer nodes have completed data consumption therefrom, including updating a state of the selected buffer as being available to receive additional data upon consumption of the data by a final consumer node of the at least two consumer nodes.

Figure 5:
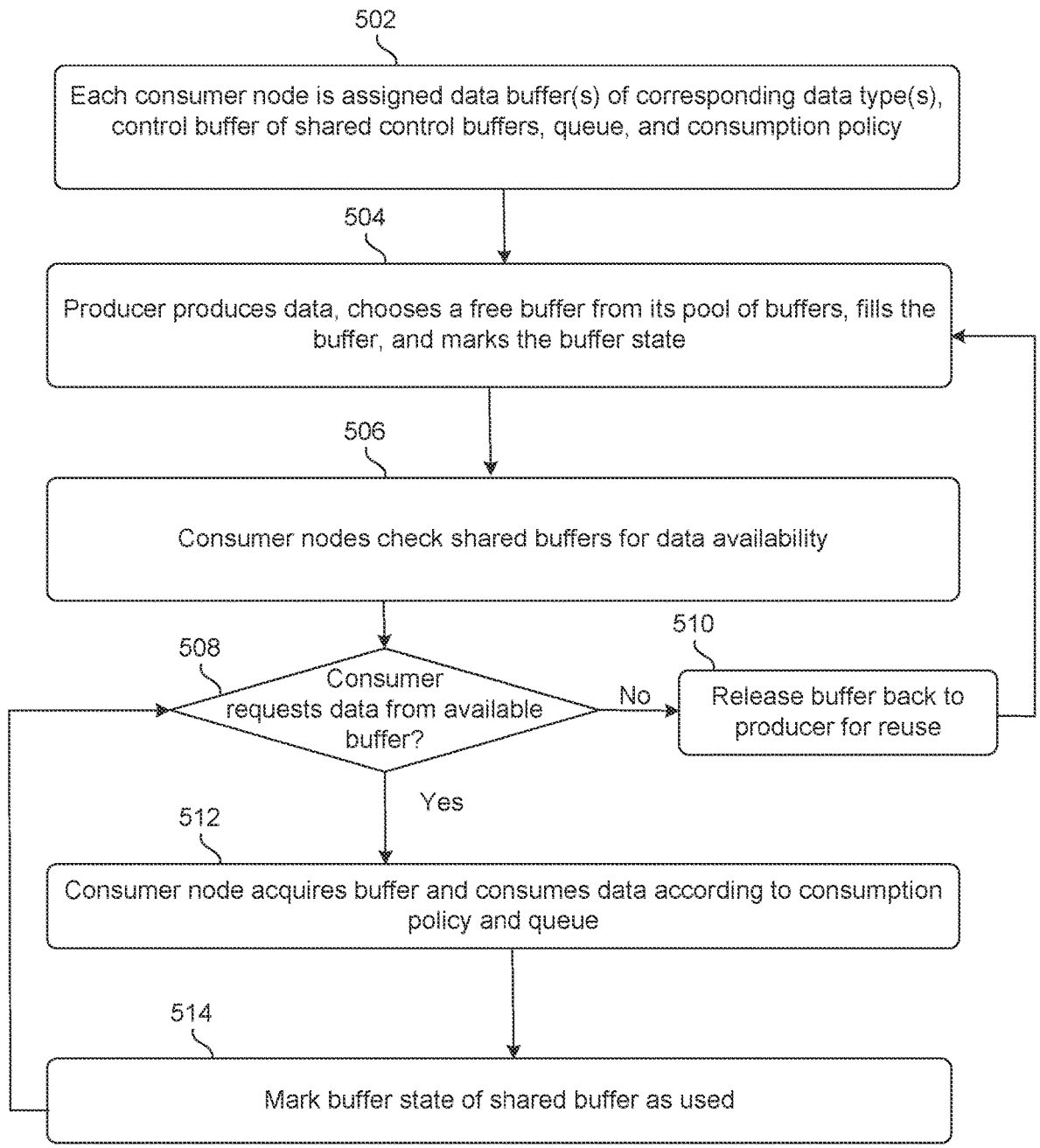
FIG. 5 is a flowchart illustrating more detailed examples of the flowchart of FIG. 4.

FIG. 5 is a flowchart illustrating more detailed examples of operations of the systems of FIGS. 1-3. In the example of FIG. 5, various operations 502-514 are illustrated as separate, sequential operations. In various implementations, however, the same or similar ones of the operations 502-514 may include sub-operations, may be performed in a different order, may include alternative or additional operations, or may omit one or more operations. Further, in all such implementations, included operations may be performed in an iterative, looped, nested, or branched fashion.

In the example of FIG. 5, each consumer node is assigned one or more shared data buffers of a corresponding data type, and a control buffer of shared control buffers, a queue, and a consumption policy (502). In other words, the system may be initialized so that each individual consumer node is configured within the overall data pipeline, with an event producer node positioned to provide centralized, individualized control of individual nodes related to event data received, and with each consumer node configured to receive designated type of data from corresponding producer nodes.

Accordingly, a producer node may produce data, select a free buffer from a corresponding or available pool of buffers, and then fill the selected buffer with the data while marking the buffer state to indicate the availability of the data to corresponding consumers sharing the data (504). Then, the relevant consumer nodes may check the corresponding shared buffers for data availability (506), e.g., based on the buffer state and/or a corresponding queue and/or consumption policy of each consumer node.

If any consumer node requests data from the available buffer (508), then the consumer node may proceed to acquire the buffer and consume data according to its local consumption policy and/or queue (512). While the consumer node has acquired the shared buffer, the shared buffer is locked to any other consumer node, so as to avoid any data corruption. The buffer state of the shared buffer may then be marked as used by the consumer node (514).

Operations may continue as long as a consumer node remains to request data from the shared buffer (508). Once all consumer nodes have acquired designated data, the shared data buffer may be released to the producer node for reuse (510).

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may, or be operatively coupled to, receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
    produce data at a producer node of a data pipeline for processing vehicle data characterizing an operation of a vehicle;
    select a data buffer from a plurality of shared data buffers, the selected data buffer being shared by at least two consumer nodes of the data pipeline;
    write the data to the selected data buffer;
    receive event data at an event producer node of the data pipeline;
    write the event data from the event producer node to at least one control buffer of a plurality of shared control buffers that are shared by the at least two consumer nodes;
    read the event data from the at least one control buffer at each of the at least two consumer nodes; and
    execute synchronized consumption of the data from the selected data buffer by each of the at least two consumer nodes, based on the event data, to thereby complete the processing and characterize the operation of the vehicle.

2. The computer program product of claim 1, wherein the data has a data type, and further wherein the selected data buffer is selected based on the data type and the at least two consumer nodes share access to the selected buffer based on the data type.

3. The computer program product of claim 1, wherein the data includes video data captured by at least one camera of the vehicle.

4. The computer program product of claim 1, wherein the instructions, when executed, cause the at least one computing device to:
    update a state of the selected data buffer when writing the data to the selected data buffer, the state indicating availability of the selected data buffer to the at least two consumer nodes for consumption thereof.

5. The computer program product of claim 1, wherein each of the at least two consumer nodes include a queue indicating a location of the selected data buffer and the at least one control buffer within the data pipeline.

6. The computer program product of claim 1, wherein the each of the at least two consumer nodes includes a consumption policy governing a manner in which the data and the event data are consumed.

7. The computer program product of claim 1, wherein a first consumer node of the at least two consumer nodes is configured to update a state of the selected data buffer to reflect consumption of the data therefrom by the first consumer node.

8. The computer program product of claim 1, wherein the instructions, when executed, cause the at least one computing device to:
    execute the synchronized consumption of the data including controlling a start, stop, or pause of data consumption by each of the at least two consumer nodes.

9. The computer program product of claim 1, wherein the at least one control buffer includes a plurality of control buffers, and wherein each of the at least two consumer nodes has access to a single control buffer of the plurality of control buffers.

10. The computer program product of claim 1, wherein the producer node is configured to manage exclusive access of the at least two consumer nodes to the selected data buffer and confirm that all of the at least two consumer nodes have completed data consumption therefrom, including updating a state of the selected buffer as being available to receive additional data upon consumption of the data by a final consumer node of the at least two consumer nodes.

11. A computer-implemented method comprising:
producing data at a producer node of a data pipeline for processing vehicle data characterizing an operation of a vehicle;
selecting a data buffer from a plurality of shared data buffers, the selected data buffer being shared by at least two consumer nodes of the data pipeline;
writing the data to the selected data buffer;
receiving event data at an event producer node of the data pipeline;
writing the event data from the event producer node to at least one control buffer of a plurality of shared control buffers that are shared by the at least two consumer nodes;
reading the event data from the at least one control buffer at each of the at least two consumer nodes; and
executing synchronized consumption of the data from the selected data buffer by each of the at least two consumer nodes, based on the event data, to thereby complete the processing and characterize the operation of the vehicle.

12. The method of claim 11, wherein the data has a data type, and further wherein the selected data buffer is selected based on the data type and the at least two consumer nodes share access to the selected buffer based on the data type.

13. The method of claim 11, further comprising:
updating a state of the selected data buffer when writing the data to the selected data buffer, the state indicating availability of the selected data buffer to the at least two consumer nodes for consumption thereof.

14. The method of claim 11, wherein a first consumer node of the at least two consumer nodes is configured to update a state of the selected data buffer to reflect consumption of the data therefrom by the first consumer node.

15. The method of claim 11, further comprising:
executing the synchronized consumption of the data including controlling a start, stop, or pause of data consumption by each of the at least two consumer nodes.

16. The method of claim 11, wherein the at least one control buffer includes a plurality of control buffers, and wherein each of the at least two consumer nodes has access to a single control buffer of the plurality of control buffers.

17. The method of claim 11, further comprising:
managing, at the producer node, exclusive access of the at least two consumer nodes to the selected data buffer;
confirming, at the producer node, that all of the at least two consumer nodes have completed data consumption therefrom; and
updating, at the producer node, a state of the selected buffer as being available to receive additional data upon consumption of the data by a final consumer node of the at least two consumer nodes.

18. A vehicle comprising:
a chassis;
a frame mounted on the chassis;
a motor mounted within the frame;
a plurality of sensors mounted on the vehicle and configured to generate sensor data characterizing an environment of the vehicle;
at least one memory including instructions; and
at least one processor that is operably coupled to the at least one memory and that is arranged and configured to execute instructions that, when executed, cause the at least one processor to:
produce data at a producer node of a data pipeline for processing vehicle data characterizing an operation of a vehicle;
select a data buffer from a plurality of shared data buffers, the selected data buffer being shared by at least two consumer nodes of the data pipeline;
write the data to the selected data buffer;
receive event data at an event producer node of the data pipeline;
write the event data from the event producer node to at least one control buffer of a plurality of shared control buffers that are shared by the at least two consumer nodes;
read the event data from the at least one control buffer at each of the at least two consumer nodes; and
execute synchronized consumption of the data from the selected data buffer by each of the at least two consumer nodes, based on the event data, to thereby complete the processing and characterize the operation of the vehicle.

19. The vehicle of claim 18, wherein the instructions, when executed, cause the at least one processor to:
manage, at the producer node, exclusive access of the at least two consumer nodes to the selected data buffer;
confirm, at the producer node, that all of the at least two consumer nodes have completed data consumption therefrom; and
update, at the producer node, a state of the selected buffer as being available to receive additional data upon consumption of the data by a final consumer node of the at least two consumer nodes.

20. The vehicle of claim 18, wherein a first consumer node of the at least two consumer nodes is configured to update a state of the selected data buffer to reflect consumption of the data therefrom by the first consumer node.

* * * * *